Sept. 30, 1941.　　　W. S. WHITTLE　　　2,257,558

REFRIGERATION

Filed Sept. 7, 1937

INVENTOR
William S. Whittle
BY
*Harry S. Demarest*
ATTORNEY

Patented Sept. 30, 1941

2,257,558

UNITED STATES PATENT OFFICE 2,257,558

REFRIGERATION

William S. Whittle, Canton, Ohio, assignor to The Hoover Company, North Canton, Ohio, a corporation of Ohio Application September 7, 1937, Serial No. 162,689

4 Claims. (Cl. 62—119.5)

It is an object of this invention to improve the general operation of a continuous three fluid absorption refrigerating system.

It is a further object of this invention to improve the operation of the heat exchange elements of a refrigerating system.

It is a further object of this invention to provide an absorber having novel features of construction and arrangement of parts.

It is a further object of this invention to provide an absorber which will simultaneously increase the efficiency of absorption, the area of gas and liquid contact, and the heat rejecting area over that previously possible with known constructions.

Other objects and advantages of the invention will become apparent as the description proceeds when taken in connection with the accompanying drawing, in which.

Figure 1:
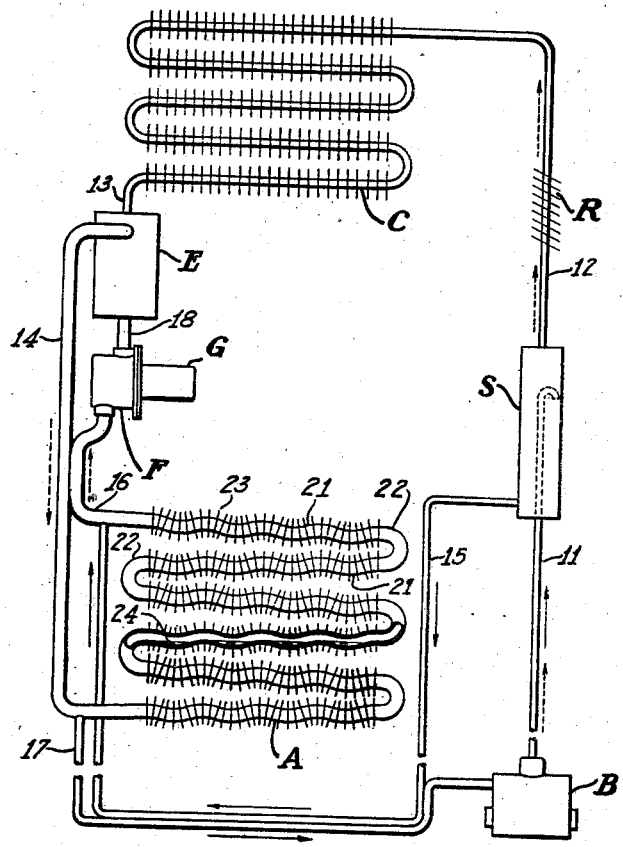
Fig. 1 is a diagrammatic illustration of a continuous three fluid absorption refrigerating system embodying my invention.

Referring to the annexed drawing and first to Fig. 1 thereof, it will be seen that I have illustrated a continuous three fluid absorption refrigerating system comprising a boiler B, a separation chamber S, a rectifier R, a condenser C, an evaporator E, an absorber A, and a pressure equalizing medium circulating fan F driven by a motor G suitably connected by various conduits to form a complete system.

The boiler B which contains a solution of refrigerant in an absorbent, preferably ammonia in water, is heated by any suitable means such as a gas burner or an electric cartridge heater. Application of heat to the solution in the boiler B vaporizes the refrigerant which collects in the boiler and functions to elevate weakened solution through the conduit 11 into the separation chamber S by the well known vapor lift action. The slugs of refrigerant vapor and weakened absorption solution are discharged through the conduit 11 into the chamber S where they separate and continue through their respective individual circuits. The vaporized refrigerant discharges from the chamber S through a conduit 12 into the condenser C. Conduit 12 contains a rectifier R which functions to condense entrained water vapor from the refrigerant which flows downwardly through conduit 12 to the separation chamber S. The condenser C is preferably of the continuous finned tube air cooled type and functions to liquefy the vaporous refrigerant supplied thereto. The liquid refrigerant is conducted from the condenser C to the evaporator E by means of a conduit 13.

In the embodiment shown, liquid refrigerant flows downwardly through the evaporator E, which may be of any desired construction, in counterflow relationship with a propelled stream of pressure equalizing medium, such as hydrogen or nitrogen, into which it evaporates to produce useful refrigeration. The mixture of refrigerant vapor and pressure equalizing medium formed in the evaporator E exits from the upper end thereof through a conduit 14 which communicates with the lower end of an absorber A to be more fully described hereinafter.

Weak solution discharged into the separation chamber S by the vapor lift conduit 11 flows downwardly therefrom by gravity through a conduit 15 which communicates with the upper end of the absorber A through a gas discharge conduit 16. The weak solution flows continuously downwardly through the absorber A by gravity in counterflow with the stream of pressure equalizing medium and refrigerant vapor supplied to the absorber through the conduit 14. During its passage through the absorber the weak solution absorbs the refrigerant vapor from the pressure equalizing medium to recondition the pressure equalizing medium which returns to the evaporator through the conduit 16. The strong solution formed in the absorber collects in the lowest point of the conduit 14 and is returned to the boiler B through a conduit 17 which is in heat exchange relationship with the conduit 15.

The purified pressure equalizing medium is discharged from the absorber A through the conduit 16, which is in heat exchange relationship with the conduit 14 previously described, into the suction inlet of the fan F. The fan F is driven by a motor G supplied with electrical energy from any suitable source of power. The pressure equalizing medium is placed under pressure by the fan F and is discharged into the lower end of the evaporator E through the conduit 18.

The motor G and the source of heat for the boiler B may be controlled in any suitable manner.

It will be understood that the system just described is illustrative only and is not to be considered in a limiting sense. My invention is equally applicable to other types of refrigerating systems and to systems utilizing different specific structures for the various elements thereof.

Figure 2:
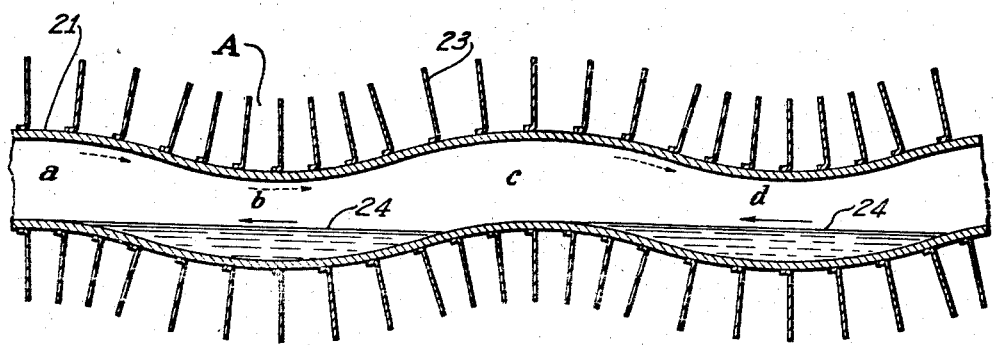
Fig. 2 is a cross sectional view on an enlarged scale of one of the elements of the refrigerating system of Fig. 1.

Referring now to Figs. 1 and 2 it will be seen that the absorber A comprises a series of serpentine tubes 21 which may be formed from a continuous reversely bent tube or from a series of similar tube sections connected at their ends by return bends at the points 22.

For purposes of convenience in illustration, the tubes 21 have been shown as positioned in a common vertical plane; however it is to be understood that the tubes 21 may be arranged in any plane from the vertical to the horizontal and are preferably positioned in the plane only slightly inclined from the horizontal. Each tube 21 is slightly inclined downwardly whereby liquid will flow therethrough by gravity. Tubes 21 are constructed of material capable of withstanding the high pressures commonly encountered in absorption refrigerating systems and are preferably constructed from material having good heat conductivity. The tubes 21 are also provided with a multiplicity of spaced cooling fins 23 which are preferably constructed of material having a high heat conductivity. The fins are bonded to the outer surfaces of the tubes 21 in any suitable manner to provide a good heat conducting connection.

In order to explain clearly the operation of my invention I have divided the tube shown in Fig. 2 into a number of so-called gas and liquid zones. Zones $a$ and $c$ are so-called gas zones and zones $b$ and $d$ are the so-called liquid zones. It will be understood that as viewed in Fig. 2 the zone $c$ is at a higher elevation than the zone $a$ and that the zone $d$ is at a higher elevation than the zone $b$. The general direction of flow of the inert gas stream is indicated by the dotted arrows in Fig. 2; the general direction of flow of the absorption solution is indicated by the solid arrows in Fig. 2. It will be seen from Fig. 2 that the effective cross sectional area of the gas stream progressively increases to a maximum at the central portions of the gas zones $a$ and $c$ and then progressively decreases to a minimum at the central portions of the liquid zones $b$ and $d$. It is also apparent that the effective cross sectional area of the liquid progressively increases downstream from the beginning of a liquid pool, which lies slightly to the left, as viewed in Fig. 2, of the central portions of the adjacent upstream gas zone, to a maximum at the central portion of the liquid zone and then progressively decreases to a minimum at the central portion of the next downstream gas zone.

In operation the absorption liquid flows downwardly continuously through the absorber from pool to pool whereas the propelled stream of pressure equalizing medium flows upwardly through the absorber in counterflow to the liquid stream. By reason of the distinctive construction herein disclosed the gas stream follows a path of constantly changing direction and cross sectional area. This produces a high degree of turbulence in the gas stream thus continually causing the fresh portions of the gas to be brought into contact with the surfaces of the liquid pools and the stream of liquid flowing from one pool to the next lower pool. The gas stream also forcibly strikes and wipes the interior walls of the conduit 21. This insures that the apparatus will operate with a maximum heat exchange efficiency and also with a maximum efficiency of gas and liquid contact. It will be noted that the zones of maximum depth for the liquid pools correspond with zones of minimum of cross sectional area for the gas stream, and also that the gas stream is directed downwardly at an acute angle toward these portions of the liquid pools; this produces a number of very desirable results. By reason of the factors just explained the gas stream is traveling at high velocity when it arrives at the portion of maximum depth for any given pool. This produces maximum pool agitation at this point thereby preventing trapping of weak solution at the bottom of the pool with the resulting inefficiency of the absorbing process. So great is the agitation produced at these portions of the pool that some spray is created and deposited on the walls of the absorber vessel thereby greatly improving the gas and liquid contact and the heat exchange to the surrounding atmosphere. Also by reason of the acute angle at which the gas stream strikes the deepest portion of the liquid pool a local swirling movement may be induced in the pool which will further assure a thorough mixing of the liquid, a thorough and continuous presentation of fresh liquid to the gas stream, and stratification in the pool is prevented. Prevention of stratification is very important for the reason that weak liquor has a higher specific gravity than strong liquor with the result that the weak liquor tends to sink to the bottom of the pool with the result that a body of saturated solution is presented to the gas stream.

Another advantage of my construction resides in the fact that any strong liquor which may concentrate on the surface of any particular pool flows off such surface over the hump of the next downstream gas zone and enters the next lower pool at an acute angle to the surface thereof which results in agitating the said next lower pool.

By reason of the serpentine construction of the tubes 21 a greater length, a greater area of gas and liquid contact surface, a greater area of tube heat exchange area, and a greater number of air cooling fins can be provided on the absorber with any given outside dimensions than would be possible with straight tubes.

The serpentine constructions of the tube causes the air cooling fins to be spaced varying distances apart and to be positioned at varying angles with respect to each other with the result that the air passing thereover is passing through areas of constantly changing cross section; this induces turbulence in the cooling air stream and promotes cooling efficiency.

Though I have illustrated my invention as applied only to an absorber it is obvious that it is equally applicable to other devices. The invention disclosed is particularly applicable to the evaporators of refrigerating systems. This invention may be applied to a conventional sectional evaporator by providing two vertically arranged spaced parallel banks of connected serpentine tubes adapted to receive ice trays therebetween and connected to an upper finned serpentine tube box-cooling coil. The evaporator may also consist of a conventional type of ice-freezing section connected to one or more finned serpentine tubes forming a box-cooling coil.

An evaporator constructed of serpentine tubes possesses many advantageous features. A ready means is provided for forming a plurality of spaced liquid pools in the evaporator and for agitating the inert gas stream without complex pipe formations or baffle inserts. The advantages flowing from the constantly changing area and direction of flow of the gas and the liquid paths in an absorber are found in an evaporator in equal degree.

A particularly advantageous system results if the serpentine tube construction is utilized in the absorber and in the evaporator. Such a system provides for excellent absorption and evaporation with very simple absorber and evaporator structures.

While I have illustrated and decribed a single embodiment of my invention this is not to be taken in a limiting sense. Various changes may be made in the arrangement and construction of parts without departing from the spirit of the invention except as limited by the scope of the appended claims.

I claim:

1. In refrigerating apparatus, a pressure equalizing medium circuit, including evaporator and absorber sections, means for propelling a pressure equalizing medium through said circuit, means for supplying liquid refrigerant to said evaporator section, means for supplying absorption liquid to said absorber section, one of said sections comprising an elongated element having a passageway of substantially uniform cross-sectional area slightly inclined to the horizontal, said passageway including alternate elevated and depressed portions whereby to form liquid pools with the points of maximum pool depth adjacent the centers of the pools whereby the liquid in each pool may drain from a shallow portion thereof into a subjacent pool over an intervening elevated portion of said passageway and the points of maximum pool depth correspond with the points of maximum pressure equalizing medium velocity, the amplitude of elevation and depression of said elevated and depressed portions, respectively, of said passageway being such that a continuous gas flow is maintained through said passageway above the liquid pools.

2. Refrigerating apparatus comprising a plurality of vessels connected together to form a continuous three-fluid absorption refrigerating system including a boiler, a condenser, an evaporator, an absorber, and a gas propelling device, said absorber being constructed of a plurality of serpentine tubes each of which is inclined slightly to the horizontal and includes alternate convex and concave portions forming a continuous passage of constant cross-sectional area, the amplitude of the displacement of said convex and concave portions of said tubes from the median lines thereof and the inclination thereof to the horizontal being such that liquid may flow by gravity from each concave portion into a subjacent concave portion without blocking said tubes to the flow of gas therethrough.

3. In refrigerating apparatus, a pressure equalizing medium circuit, including evaporator and absorber sections, means for propelling a pressure equalizing medium through said circuit, means for supplying liquid refrigerant to said evaporator section, means for supplying absorption liquid to said absorber section, said absorber section comprising an elongated element having a passageway of substantially uniform cross-sectional area slightly inclined to the horizontal, said passageway including alternate elevated and depressed portions whereby to form pools of absorption liquid with the points of maximum pool depth adjacent the centers of the pools whereby the liquid in each pool may drain from a shallow portion thereof into a subjacent pool over an intervening elevated portion of said passageway and the points of maximum pool depth correspond with the points of maximum pressure equalizing medium velocity, the amplitude of elevation and depression of said elevated and depressed portions, respectively, of said passageway being such that a continuous gas flow path is maintained through said passageway above the liquid pools.

4. An absorber for three-fluid absorption refrigerating systems comprising an elongated element having a passageway therethrough of substantially constant cross-sectional area, means for supplying an absorbing liquid to the higher end of said element and for removing the absorbing liquid and an absorbed medium from the lower end thereof, means for supplying a medium to be absorbed to said element, said element being formed to provide alternate concave and convex portions in said passageway whereby spaced pools of absorbing liquid in said concave portions which drain over said convex portions to subjacent pools of absorbing liquid, the displacement of said concave and convex portions of said passageway being insufficient to cause the upper wall of any concave portion of said passageway to contact the surface of the liquid pool on the bottom wall of any concave portion of said passageway.

WILLIAM S. WHITTLE.